G. DELAGE.
PENETRATION CONE FOR AIRCRAFT.
APPLICATION FILED JUNE 28, 1918.
1,331,187.
Patented Feb. 17, 1920.
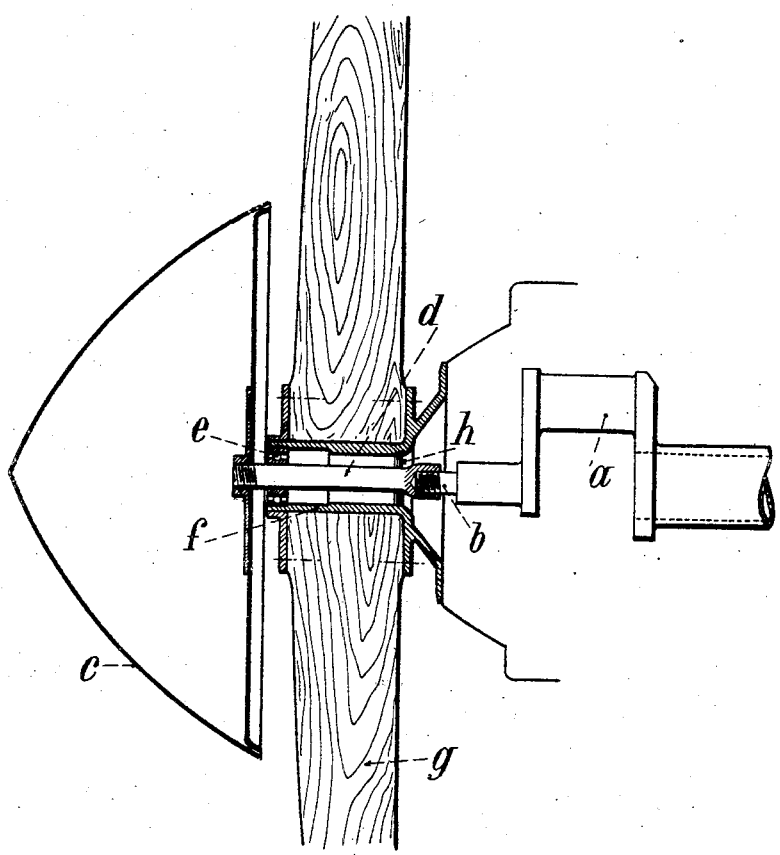

UNITED STATES PATENT OFFICE.

GUSTAVE DELAGE, OF ISSY LES MOULINEAUX, FRANCE, ASSIGNOR TO SOCIETE ANONYME DES ETABLISSEMENTS NIEUPORT, ISSY LES MOULINEAUX, FRANCE.

PENETRATION-CONE FOR AIRCRAFT.

1,331,187.                Specification of Letters Patent.        Patented Feb. 17, 1920.

Application filed June 28, 1918. Serial No. 242,451.

*To all whom it may concern:*

Be it known that I, GUSTAVE DELAGE, a citizen of the French Republic, residing at Issy les Moulineaux, Seine, France, have invented certain new and useful Improvements in Penetration-Cones for Aircraft, of which the following is a specification.

This invention relates to a penetration cone device for aircraft, of the kind which is arranged in front of the propeller and intended to reduce the resistance to advance of an aircraft provided with a rotary engine.

The penetration cone according to this invention is fixedly mounted on an extension of the crank shaft passing through the hub of the propeller.

A construction of the device is illustrated, by way of example, in the single figure of the accompanying drawing which shows it diagrammatically in section.

The fixed crank shaft $a$ of a rotary engine arranged at the front of an aircraft, is provided at its end $b$ with a short piece of shaft $d$ extending the said crank shaft and passing through the hub $f$ of the propeller $g$ which rotates with the cylinders of the engine. On the front end of the shaft $d$, and in front of the propeller $g$ is secured a cap $c$ shaped as shown and forming a penetration cone.

A ball bearing $e$ is inserted between the shaft $d$ and the hub $f$.

A joint or packing $h$ arranged in the hollow rear part of the propeller hub, prevents oil from escaping outwardly.

In these conditions, the propeller $g$ rotates about the fixed shaft $d$ without driving the cap $c$ which remains absolutely fixed and is always perfectly centered relatively to the said propeller owing to its being mounted by means of a ball bearing in the hub of the latter.

What I claim as my invention and desire to secure by Letters Patent is:—

1. In an aircraft, the combination with the propeller, of a rotary engine arranged at the front of the aircraft for driving the propeller, an extension on the fixed crankshaft of the engine extending forwardly through the hub of the propeller, a bearing for the propeller arranged intermediate the hub of the latter and the said extension, and a cap secured to the forward end of said extension and forming a penetration cone, as set forth.

2. In an aircraft, the combination with the propeller, of a rotary engine arranged at the front of the aircraft for driving the propeller, an extension on the fixed crankshaft of the engine extending forwardly through the hub of the propeller, a bearing for the propeller arranged intermediate the hub of the latter and the said extension, a cap secured to the forward end of said extension and forming a penetration cone, and a packing arranged within the hollow rear part of the propeller hub around the said extension, for the purpose set forth.

In testimony whereof I have signed my name to this specification in the presence of two subscribing witnesses.

GUSTAVE DELAGE.

Witnesses:
CHAS. P. PRESSLY,
VICTOR DUPONT.